United States Patent [19]
Murphy

[11] Patent Number: 5,205,786
[45] Date of Patent: Apr. 27, 1993

[54] LEVEL BED HARVESTER

[76] Inventor: Ronald G. Murphy, 1349 E. Clearwater La., Gilbert, Ariz. 85234

[21] Appl. No.: 687,169

[22] Filed: Apr. 18, 1991

[51] Int. Cl.⁵ .............................................. A01F 12/34
[52] U.S. Cl. .............................................. 460/9; 460/95
[58] Field of Search ................ 460/9, 8, 10, 85, 94, 460/95, 102

[56]   References Cited
U.S. PATENT DOCUMENTS

| | | | |
|---|---|---|---|
| 2,500,448 | 3/1950 | Bozarth | 280/6.1 |
| 3,646,373 | 2/1972 | Hayes | 460/85 |
| 4,425,925 | 1/1984 | Kersting et al. | 460/10 X |
| 4,548,214 | 10/1985 | Sheehan et al. | 460/9 |

Primary Examiner—Terry Lee Melius

[57] ABSTRACT

An improved multiple tilt screen harvester has each screen capable of independent motion. The multiple screen assembly may be removed and installed as a unit on a harvester. Retrofit on an existing harvester requires no wall accommodating openings for an exterior pendulum plumb mass, there being no such mass required exterior of the harvester.

3 Claims, 1 Drawing Sheet

2

LEVEL BED HARVESTER

BACKGROUND

1. Technical Field of the Invention

The invention relates to improvements in harvesting machines. In particular, the invention relates to improvement in the automatic leveling of harvester shaker screens where the harvested seed, etc., is separated from straw, and chaff.

2. Prior Background Art

When a harvesting machine moves through a field, it plucks the produce—grain, corn, etc.—and deposits it, eventually, on a screen along with various vegetative wastes, referred to herein generally as "chaff." The grain, corn, etc., hereinafter referred to generally as "seed," passes through the screen to be accumulated as part of the days harvest. The chaff falls over the end of the screen to be returned to the field. Efficiency demands that little, and preferably none, of the seed shall be contained in the chaff returned to the field.

The screen is on a shaker bed. The bed vibrates the screen to improve the efficiency of the screening action. The harvester, itself, is a well organized machine. It travels at a speed which enables it to pick just enough seed to be transferred to the screen without overflowing the screen. The driver is in control of the harvester and experiences little challenge in maintaining proper speed so long as the field is level. Problems can arise, however, when the field is not level.

When the harvester travels a level field, material to be screened by the shaker screen will cover the screen surface fairly uniformly, However, with even a slight slope in the field there is a tilt imparted to the shaker screen and the material accumulates on the "down hill" portion of the screen. This decreases the efficiency of the screening action since a part of the screen is NOT being utilized.

The practical effect of working a harvester on a slope is the necessity of reducing the speed at which the harvester travels through the field, as compared to its speed over a level field. The slower speed is required to permit the seed, accumulated now on only a portion of the screen surface, to pass through the screen, rather than be ejected with the chaff.

Reducing the speed of harvester travel through the field means that the rate at which the harvest is achieved is reduced as well. More fuel is used because more days of working are required to complete the harvest. In general, there will be a lower yield from a sloping field directly attributable to the slower speed of harvest. The longer a ripe crop is allowed to remain in the field, the more "fruit" that drops to the ground, and the more plants that droop and fall to be missed by the passing harvester.

Such losses in efficiency can, conceivably, be obviated by the simple expedient of maintaining the shaker screen in a level plane regardless of the disposition of the harvester. But, with the large screen generally employed, too much space above and below the screen must be reserved within the harvester to accommodate the arc travel of the edge of the screen. If several smaller screens are used, instead of one large screen, the arc traveled by the edge of the smaller screen is less than that of the larger screen for a given angle of tilt.

A plurality of smaller, tilting screens was the solution taught by E. W. Bozarth in U.S. Pat. No. 2,500,448, issued Mar. 14, 1950. His solution, however, required that each individual screen be coupled to its neighbor and that all be coupled to a pendulum mass mounted exterior of the harvester. The solution could not be easily applied, retroactively, to an existing harvester. Physical changes to the harvester body were necessitated with the installation of Bozarth' tilting screens on the harvester. Once installed, a major effort was required to remove the installation.

It is the intent of the present invention to improve upon the prior art teachings re the use of self leveling, multiple, shaker screens on a harvester. It is intended that the present invention will be readily installed and removed from a harvester with relative ease; that no significant modifications will need to be made to the harvester to allow the installation of the invention; and, that the original, non-leveling shaker bed may be readily reinstalled on the harvester when desired.

SUMMARY DESCRIPTION OF THE INVENTION

The invention may be summarized as an improvement in a combined harvester wherein the passage of seeds and waste material is over a series of laterally adjacent screens which rise and fall relative to each other as the harvester changes its angle relative to the horizontal. However, the screens remain level from side to side. The harvester has a housing. There are a plurality of screens arranged side by side in the housing with means pivotally mounting the screens for rocking movement about longitudinal axes between the sides of the housing. The longitudinal axes lie in the same plane as pendulum which is coupled to the screens. The pendulum is on an axis in the same plane as the aforesaid longitudinal axes so as to swing transverse to the axes. The coupling of the screens and the pendulum is operative to maintain the screens at right angles to the arm of the pendulum.

The improvement itself comprises a first one of the plurality of screens being independently pivotal without introducing rocking motion in the remaining plurality of screens. The pendulum comprises a plurality of pendulums interior of the housings a first one of the plurality of pendulums being coupled to the first one of the screens. The coupling of the first one of the plurality of screens and the first one of the plurality of pendulums is operative to maintain the first one of the screens side-to-side horizontal independent of any of the rocking motion experienced by the remaining plurality of screens.

The improvement is shown to further comprise a frame within which the plurality of screens are pivotally coupled, the frame being removable coupled to the housing for ease of installation and removal of the frame and screens in and from the housing. In addition, there are screen separator walls the walls defining, at least in part, a circular void within which the screens move pivotally, the walls being further coupled within the frame whereby the frame is strengthened and further adapted for moving the screens and screen wall with the frame as an assembly.

DETAILS OF BEST MODE FOR CARRYING OUT THE INVENTION

Figure 3:
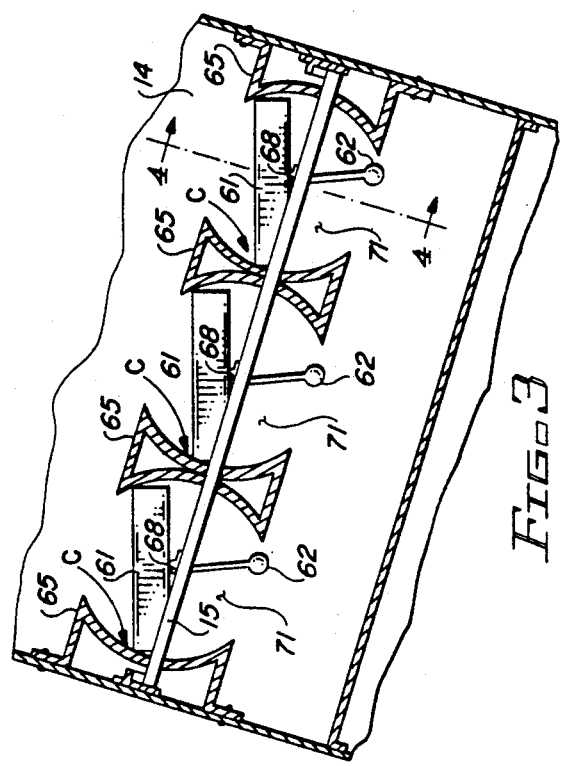
FIG. 3 is a diagrammatic cross sectional view through the housing of a combined harvester showing the improved multiple tilt screen arrangement disclosed herein.

For purposes of promoting an understanding of the principles of the invention, reference will now be made to the embodiments illustrated in the drawings and specific language will be used to describe same. it will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

Figure 1:
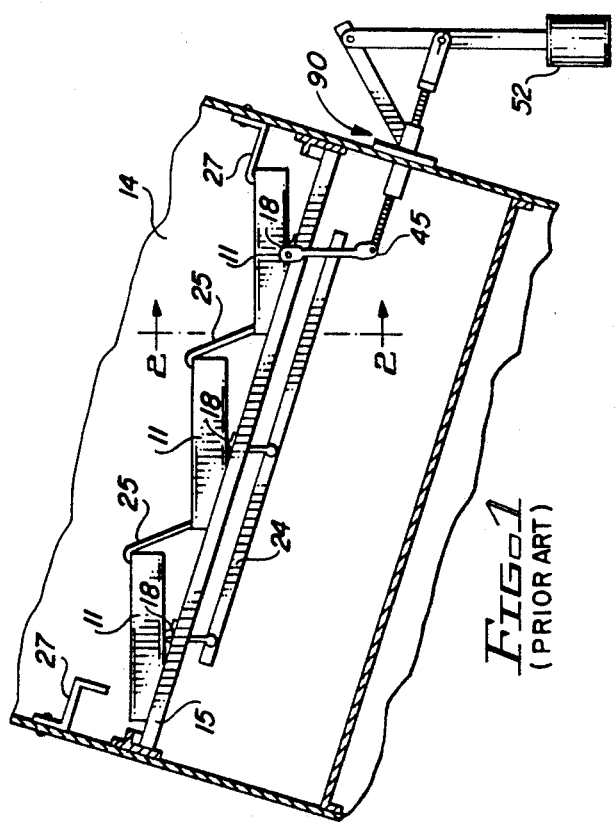
FIG. 1 is a diagrammatic cross sectional view through the housing of a combined harvester showing the prior art multiple tilt screen arrangement of Bozarth.
Figure 2:
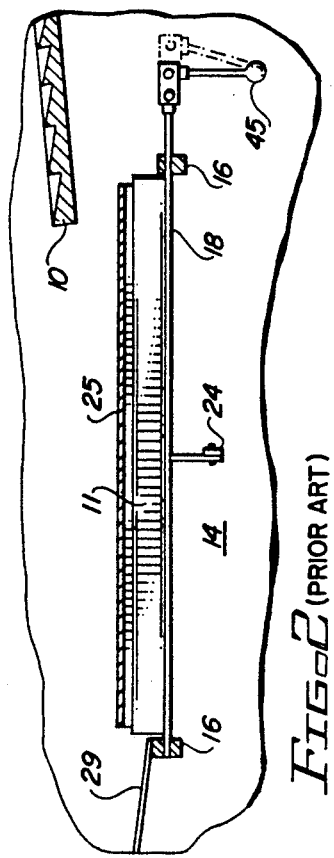
FIG. 2 is a sectional view taken on line 2—2 of FIG. 1.

In the patent to Bozarth, noted above and incorporated herein by reference, he discloses the multiple tilt screen arrangement shown in FIGS. 1 and 2, drawn. Material feeds from grain pan 10 on to a plurality of screening units 11. Screening units 11 are coupled to pivot rods 18. The rods, in turn, are pivotally coupled to cross members 16 of frame 15.

Each of the screening units 11 has its pivot rod 18 coupled to cross bar 24, which, in its turn, is coupled, via coupling 45 to pendulum 52. Pendulum 52 remains plumb as housing 14 tips to one side or the other as the harvester travels over sloping ground. The coupling between pendulum 52 and screen units 11 maintains the beds of screen units 11 in a generally horizontal plane, assuming the tilt of the harvester is, as usual, to one side or the other rather than fore and aft.

By this arrangement, seed deposited on screening units 11 from grain pan 10 will tend to cover the bed of each screening unit uniformly as the screening units are shaken. Bozarth provides flexible strips 25 between screen units 11, as well as guards 27 on the wall of housing 14 to prevent loss of seed which may be occasionally be jarred to the edge of a screen unit.

The present invention seeks to improve upon the teachings of Bozarth. Bozarth's structure required that each and every one of screen units 11 be coupled together so as to tilt in unison in common response to the movement of harvester housing 14 with respect to the relatively immobile and plumb, pendulum 52. Each of screens 11, and its load of seed and chaff, contributes to the total mass which must be offset and stabilized by the mass of pendulum 52. Thus, the mass of Bozarth's pendulum is significant. Further, any resistance to pivotal movement experienced by any one of Bozarth's screens 11 tends to impair the overall functioning of the device.

In addition, as is readily seen in FIG. 1, Bozarth required an opening in the wall of harvester housing 14 to permit screen units 11 to be coupled to pendulum 52, located exterior of housing 14.

All told, the structural arrangement required by Bozarth's claims tend to load down the functioning of the multiple tilt screens as well as compounding installation problems by requiring modifications be made to the housing walls. If the Bozarth device were to be damaged, it would be inconvenient to remove his screens and substitute the original equipment manufacturer's screen so that harvesting efforts could continue while repairs were being made to the multiple screen arrangement.

Figure 4:
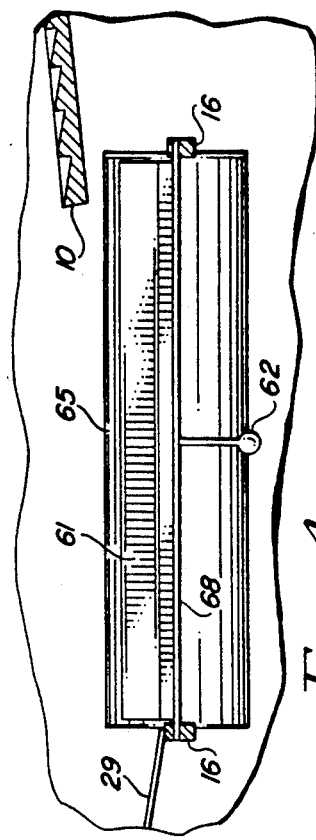
FIG. 4 is a sectional view taken on line 4—4 of FIG. 3.

The improvement taught by the inventor herein is illustrated in FIGS. 3 and 4. A plurality of screening units 61 is pivotally coupled via pivot rod 68 to cross members 16 of frame 15. Depending from each of pivot rods 68, or otherwise coupled to screens 61, is a pendulum 62. As opposed to the massive pendulum 52 of the Bozarth design, the instant pendulums 62 need only be massive enough to stabilize a single screen 61 and the screen's load of seed and chaff.

Further, each of screens 68 can move pivotally independent of movement of the other screens 61. Thus, if the pivotal action of one screen's coupling becomes impaired, the ability to stabilize the remaining screens 61 is not affected. In addition, the structure taught herein does not demand such modification of the housing 14 as was necessitated by the need to pierce the housing wall of the Bozerth housing in order to incorporate an external pendulum 52. It will be seen that the instant structural arrangement may be readily installed and removed from housing 14.

Note that each of screens 68 rotates within a circular void 71 defined, in part, by screen separator walls 65. Frame 15 supports and contains the various elements of the invention including screens 61, pivot rods 68, pendulums 62 and screen separator walls 65. Frame 15 of the instant invention has been illustrated as made up of cross members 16 of relatively small cross sectional area. This was done to allow a direct comparison with the structure of Bozarth, shown in FIGS. 1 and 2. Bozarth's frame 15 had nothing to couple to structurally except to pivot rods 18. The frame 15 with screens 18 pivotally mounted to the frame by pivot rods 18 would have been an unwieldy arrangement, difficult to move. The flexible strips 25 connecting the sides of Bozarth's screens 11 add no structural support. The spill guards 27, mounted on the wall of housing 14 for no structural part of the frame and screen assemble.

With the addition of screen separator walls 65 (see FIG. 3) significant improvement results. Frame 15 when joined to separator walls 65 forms a rigid structure which may be readily moved as a unit. Structural strength and rigidity will be enhanced by making the width to the cross members of frame 15 approach the height dimension of screen separator walls 65. This structure may be readily removed from the harvester if repairs are needed of if the anticipated harvesting field sites are level.

In FIG. 3, the clearance C between a screen 61 and screen separator wall 65 is shown as minimal. In practice, a wiping edge making flexible contact with screen separator walls 65 will be utilized. Use of a flexible wiper contact will obviate the need to maintain tight assemble tolerances and will prevent the immobilization of movement of a screen should a seed or bit of chaff pass between separator wall 65 and screen 61

What has been disclosed if an improved multiple tilt screen harvester wherein each screen is capable of independent motion. The multiple screen assembly may be removed and installed as a unit on a harvester. Retrofit on an existing harvester requires no wall accommodation for an exterior pendulum plumb mass, there being no such mass required exterior of the harvester.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such clear and concise manner that those skilled in the art may readily understand and practice the invention, That which is claimed is:

1. In a combined harvester wherein the passage of seeds and waste material is over a series of laterally adjacent screens which rise and fall relative to each other as the harvester changes its angle relative to the horizontal, but which remain level from side to side, said harvester having a housing, a plurality of screens arranged side by side in said housing, means pivotally mounting said screens for rocking movement about longitudinal axes between the sides thereof, said longitudinal axes lying in the same plane, a pendulum coupled to each of said plurality of screens, said pendulum being on an axis in the same plane as the aforesaid longitudinal axes lying in the same plane, a pendulum coupled to each of said plurality of screens, said pendulum being on an axis in the same plane as the aforesaid longitudinal axes so as to swing transverse to said axes, said coupling of said screens and said pendulum being operative to maintain said screens at right angles to the arm of said pendulum, the improvement comprising: maintain said screens at right angles to the arm of said pendulum, The improvement comprising:

a first one of said plurality of screens being independently pivotal without introducing rocking motion in the remaining plurality of screens;

said pendulum comprising a plurality of pendulums interior of said housings a first one of said plurality of pendulums being coupled to said first one of said screens, said first one of said plurality of pendulums being on an axis in the same plane as said aforesaid longitudinal axes so as to swing transverse to said axes;

said coupling of said first one of said plurality of screens and said first one of said plurality of pendulums being operative to maintain said first one of said screens side-to-side horizontal, independent of any of said rocking motion experienced by the remaining plurality of screens.

2. The improvement of claim 1 further comprising a frame within which said plurality of screens are pivotally coupled, said frame being removably coupled to said housing for ease of installation and removal of said frame and screens in and from said housing.

3. The improvement of claim 2 further comprising screen separator walls, said walls defining, at least in part, a circular void within which said screens move pivotally, said walls being further coupled within said frame whereby said frame is strengthened and further adapted for moving said screens and screen wall with said frame as an assembly.

* * * * *